Jan. 9, 1934. J. KAUTZKY, JR 1,942,710
FREE LINE CASTING LEVEL WIND REEL OF THE NONFREE SPOOL TYPE
Filed May 2, 1932
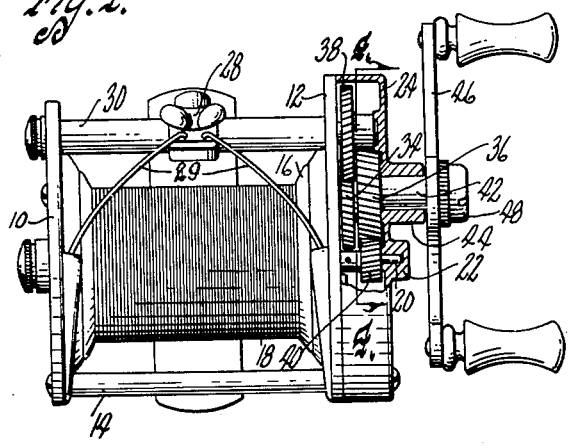
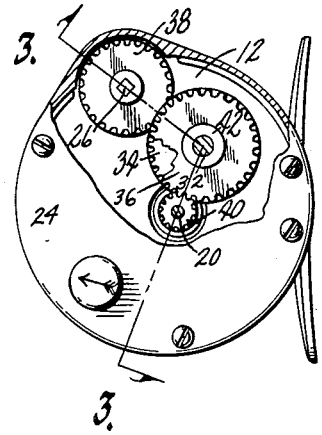
Inventor
Joe Kautzky, Jr.
By Bair, Freeman & Sinclair
Attorneys
Witness
H. S. Munyenmaier Patented Jan. 9, 1934

1,942,710

UNITED STATES PATENT OFFICE 1,942,710

FREE-LINE-CASTING LEVEL-WIND REEL OF THE NONFREE-SPOOL TYPE

Joe Kautzky, Jr., Fort Dodge, Iowa

Application May 2, 1932. Serial No. 608,707

4 Claims. (Cl. 242—84.4)

This invention relates to a non-free-spool level-winding fishing reel, and the primary object is to provide means for automatically disconnecting the traversing line carriage from the winding mechanism during the outward travel of the line as in the act of making a cast, thereby eliminating excessive wear on the level-wind mechanism and also freeing the line of undesirable drag which would be caused by the operation of the level-wind mechanism during the outward travel of the line.

A further object of the invention is to provide an improved construction for a fishing reel which obviates the objections to free-spool mechanism and yet is so arranged that the level-winding mechanism is disengaged from the winding gears immediately upon the beginning of reverse movement of the crank, as when a cast is made or the line starts paying out for any reason.

A further object of the invention is to provide an improved fishing reel of the character set forth and which is simple and inexpensive and not subject to excessive wear in use.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:—

Figure 1 is a top view, partly in section, of a fishing reel embodying my invention.

Figure 2 is an end elevation of the reel, portions being broken away and shown in section to illustrate some of the winding mechanism.

Figure 3 is an enlarged transverse section substantially on the line 3—3 of Figure 2.

Figure 4 is a detail section on the line 4—4 of Figure 1.

One of the important features of a good fishing reel is a level-wind mechanism including a line carriage arranged for traversing or back and forth movement across the front part of the reel and adapted to be engaged by the line as it is reeled in, whereby the line is evenly distributed as it is wound on the spool. Such a level-wind mechanism should of course be so constructed that the line is readily disengaged from the carriage when a cast is made, so that the line is freed at that time for rapid outward travel.

Many reels of the more expensive kind also include, in addition to the level-winding mechanism, the provision of freeing the spool from the winding gears at the time of making a cast, so that the only movable part of the reel at such time is the spool itself. The free-spool feature assists in the act of casting because it reduces to a minimum the drag or retarding influence on the outwardly traveling line.

In a free-spool level-wind reel, the spool is of course freed from the line carriage so that during movement of the spool for making a cast there is no traversing movement of the carriage.

However, the free-spool feature is of assistance to only a very small percentage of reel users, namely the expert class. The vast majority of reel users could not successfully handle a free-spool reel on account of the uncontrolled action of a spool which is entirely free, this often resulting in too rapid or too great outward travel of the uncontrolled line, inasmuch as the winding crank is, during outward travel of the line, entirely disengaged from the spool in a device of that kind.

It is my purpose therefore in the present invention to provide a fishing reel of the non-free-spool type, or in other words—one in which the winding crank is not disengaged from the spool during reverse travel or outward movement of the line; and at the same time to provide means for automatically disengaging the line carriage at such times so that traversing movement of the carriage is discontinued while the line is paying out.

It will be understood that outward movement of the line usually is rapid, whether while a cast is being made or while a fish is being played, and that this rapid movement, if communicated to the line carriage, would not only cause excessive wear on the traversing and reversing mechanism but would also constitute a very noticeable drag or retarding influence on the line. By providing means for automatically freeing the line carriage, while leaving the winding crank in engagement with the spool through the winding mechanism, I have produced a reel which overcomes the difficulties and troubles above mentioned.

The reel includes a substantially cylindrical skeleton frame composed primarily of a pair of spaced head plates 10 and 12 connected by a number of cross bars 14 circumferentially spaced. A spool 16 is suitably journaled for rotation within the skeleton frame and is adapted to receive a fishing line 18 to be wound thereon. The spool 16 is fixed to a shaft 20 which is journaled in the head plates 10 and 12 and in a bearing 22 formed on a substantially cylindrical housing member 24 which is mounted on the head plate 12.

At the front part of the reel and in front of the spool 16 there is arranged transversely a line carriage shaft 26 which is journaled in the head plates 10 and 12 and extends within the housing 24. A line carriage 28 is arranged for traversing movement on a cross member 30 which is mounted at the front of the device and partially encloses the shaft 26. Guide arms 29 are associated with the carriage 28. The carriage 28 has suitable connections with the shaft 26 causing the carriage to move back and forth along the member 30 when the spool 16 is turned for winding in the line 18. The purpose of the carriage 28 and the guide arms 29 is to engage the incoming line and cause it to be uniformly laid or level wound on the spool as it is reeled in and as the carriage moves back and forth. The actual construction of the carriage, the guide arms and the means for causing traversing movement of the carriage form no part of my present invention, but may be such as are illustrated, described and claimed in my co-pending application filed August 4, 1930, Serial No. 472,812, Patent No. 1,862,683, issued June 14, 1932.

A spindle 32 is fixed rigidly in the head plate 12 and extends outwardly therefrom at a point substantially between the axis of the reel, as defined by the spool shaft 20, and the line carriage shaft 26, said spindle extending through the housing member 24 and projecting therefrom.

Rotatably and independently mounted on the spindle 32, within the housing member 24, are a pair of gears designated by the numerals 34 and 36. The innermost gear 34 is in mesh with a pinion 38 fixed on the end portion of the line carriage shaft 26 while the outermost gear 36 is in mesh with a pinion 40 fixed on the spool shaft 20.

The outermost gear 36 of the winding mechanism is formed with a sleeve-like hub 42 which projects outwardly and is journaled on the outer end portion of the spindle 32 and within a bearing boss 44 projecting outwardly from the housing member 24. The sleeve-like hub 42 projects beyond the boss 44 and is formed angular in section to receive a winding crank 46, preferably of double type, or in other words—having a handle at each end to better balance the parts and prevent vibration. The crank 46 is held in place by a cap 48 screwed on the threaded outer end of the hub member 42.

Suitable means is provided for clutching together or operatively connecting the winding gears 34 and 36 when the winding crank 46 is turned in clockwise direction for winding in the line and for permitting these gears to be disconnected when the crank is turned reversely as the line is paid out by unwinding of the spool 16. This function is accomplished, in this instance, by a ratchet and pawl connection between the winding gears 34 and 36.

The gear 36 is recessed on its inner face and the gear 34 is formed with an integral boss or similar projection 50 of substantially circular form, which projects within the recess. The boss 50 is in the nature of a ratchet having in this instance two diametrically opposed ratchet notches designated by the numeral 52.

Within the recess of the gear 36 is pivotally mounted a pawl 54, being pivoted near one end on a pin 56. The pawl 54 is formed with a tooth 58 adapted to engage in either of the notches of the ratchet 50. A counterweight 60 preferably is rigidly mounted in the recess of the gear 36 opposite to the pawl 54 to counterbalance said pawl and prevent vibration and chattering. A light leaf spring 62 is fixed at one end within the gear 36 and has its opposite end loosely engaging the short end of the pawl 54. It is the function of the spring 62 to urge the pawl toward the position shown by solid lines in Figure 4 for engagement with the ratchet.

It will be observed that the winding gear 36 is constantly in mesh with the pinion 40 so that there is always an operative connection between the crank 46 and the spool 16, regardless of which direction these members are turning. Consequently the reel is of the non-free-spool type as previously stated so that the user is enabled to be always in control of the spool by holding the crank.

Likewise, the gear 34 is in constant mesh with the pinion 38 which governs the rotation of the shaft 26 and the traversing movement of the line carriage 28. However, no movement of these parts occurs except when the gear 34 is clutched to the gear 36 by the operation of the ratchet and pawl devices.

When the crank 46 is being turned forwardly or in a clockwise direction for the purpose of winding in the line and laying it upon the spool, the rotary movement is relatively slow and the action of the light spring 62 is sufficient to hold the pawl 54 in operative position for engagement with the ratchet, thereby effecting an operative connection between the winding gears. By this means the shaft 26 is rotated and the carriage 28 is caused to travel back and forth along the cross member 30 for laying the line uniformly and smoothly on the spool.

Whenever the crank 46 is rotated reversely or in a counter clockwise direction, whether manually or because of an outward pull on the line 18 to cause a reverse rotation of the spool 16, the clutch connection is released and the pawl 54 slides freely over the notches of the ratchet, the curved portions of the periphery of the member 50 between the notches causing the pawl to be moved toward the dotted line position in Figure 4. However, when the line is moving outwardly it is usually a rapid movement, either because of the force employed in making a cast or because of pull on the line by a fish. The rapid reverse movement of the spool causes a similar rapid movement of the gear 36, through the shaft 20 and pinion 40, and this rapid movement, by centrifugal force, causes the pawl 54 to be thrown outwardly on its pivot to the dotted line position of Figure 4, against the influence of the spring 62. In actual practice, therefore, there is usually no contact whatever between the pawl and the ratchet while the line is being paid out, inasmuch as the centrifugal force thus engendered is sufficient to hold the pawl outwardly against the influence of the light spring 62.

It follows therefore that while the line is being paid out the winding gears are automatically disconnected and there is no rotary movement of the gear 34, pinion 38 or shaft 26, and no traversing movement of the carriage 28. By causing these parts to remain immobile at such times, I am enabled to save the drag or retarding influence which their movement would have on the other parts, and likewise eliminate the wear which would naturally occur because of the rapid movement of the line carriage. In fact, it has been observed that when the carriage is permitted to travel back and forth during reverse movement of the spool, there is occasioned so much wear on some of the parts, particularly those which cause the traversing movement of the carriage, that they must be replaced at least once each season, thus causing considerable expense.

In order to further eliminate friction and wear I have arranged the winding gears 34 and 36 so that there is no actual contact between them, except, at times, through the clutch connections. By referring to Figure 3 it will be observed that these gears are slightly spaced apart on the spindle 32 and are held in such spaced relation by a shoulder 64 formed intermediate of the ends of said spindle and engaging the inner face of the gear 36.

While I have shown and described the detachable connection or clutch connection between the winding crank and spool on the one hand and the level-wind mechanism on the other hand as being located between two winding gears which are respectively associated with the crank and the level-wind mechanism,—yet I wish it to be understood that such detachable connections may be placed at any suitable location in the winding mechanism, whereby the level-wind mechanism may be automatically detached from the winding mechanism during reverse movement of the latter.

I claim as my invention:—

1. In a fishing reel of the non-free-spool type, a frame, a spool shaft rotatably mounted therein, a spool fixed to said shaft, a line carriage shaft rotatably mounted in the frame, a carriage arranged for reciprocation in front of the spool during rotary movement of said carriage shaft, a spindle fixed to the frame, a pair of winding gears rotatably mounted on said spindle, a pinion on the spool shaft meshing with one of said gears, a pinion on the carriage shaft meshing with the other gear, a crank rotatably mounted and connected with the gear which is arranged for turning the spool shaft, and detachable connections between said gears for causing interengagement when the crank is rotated in one direction and for automatically disengaging them when the crank and spool are turned in the opposite direction.

2. In a fishing reel of the non-free-spool type, a frame, a spool shaft rotatably mounted therein, a spool fixed to said shaft, a line carriage shaft rotatably mounted in the frame, a carriage arranged for reciprocation in front of the spool during rotary movement of said carriage shaft, a spindle fixed to the frame, a pair of winding gears rotatably mounted on said spindle, a pinion on the spool shaft meshing with one of said gears, a pinion on the carriage shaft meshing with the other gear, a crank rotatably mounted and connected with the gear which is arranged for turning the spool shaft, a ratchet on one of said gears, and a pawl pivoted on the other gear for engagement with said ratchet during rotary movement in one direction only.

3. In a fishing reel of the non-free-spool type, a frame, a spool shaft rotatably mounted therein, a spool fixed to said shaft, a line carriage shaft rotatably mounted in the frame, a carriage arranged for reciprocation in front of the spool during rotary movement of said carriage shaft, a spindle fixed to the frame, a pair of winding gears rotatably mounted on said spindle, a pinion on the spool shaft meshing with one of said gears, a pinion on the carriage shaft meshing with the other gear, a crank rotatably mounted and connected with the gear which is arranged for turning the spool shaft, a ratchet on one of said gears, a pawl pivoted on the other gear for engagement with said ratchet during rotary movement in one direction only, and a light spring urging said pawl toward engaging position but permitting said pawl to be moved to disengaging position during reverse rotary movement of the gear on which it is mounted.

4. In a fishing reel of the non-free-spool type, a spool arranged for rotation in either direction, a crank, a pair of gears for constantly gearing said crank to said spool, a line carriage shaft mounted for rotation, a carriage arranged for reciprocation along said shaft during rotary movement of the latter, a second pair of gears for driving said line carriage shaft and means of connection between said crank and said second pair of gears for rotating the line carriage shaft and the second pair of gears during movement of the crank in one direction and for causing the second pair of gears, the line carriage shaft and the line carriage to stand idle during the rotation of the crank, the first pair of gears and the spool only in an opposite direction.

JOE KAUTZKY, JR.